US011044396B2

United States Patent
Kawai (10) Patent No.: US 11,044,396 B2
(45) Date of Patent: Jun. 22, 2021

(54) IMAGE PROCESSING APPARATUS FOR CALCULATING A COMPOSITE RATIO OF EACH AREA BASED ON A CONTRAST VALUE OF IMAGES, CONTROL METHOD OF IMAGE PROCESSING APPARATUS, AND COMPUTER-READABLE STORAGE MEDIUM

(71) Applicant: CANON KABUSHIKI KAISHA, Tokyo (JP)

(72) Inventor: Yusuke Kawai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/514,873

(22) Filed: Jul. 17, 2019

(65) Prior Publication Data

US 2020/0036890 A1 Jan. 30, 2020

(30) Foreign Application Priority Data

Jul. 30, 2018 (JP) .............................. JP2018-142905

(51) Int. Cl.
*H04N 5/232* (2006.01)
*G06T 5/00* (2006.01)
(Continued)

(52) U.S. Cl.
CPC ......... *H04N 5/23232* (2013.01); *G06T 5/002* (2013.01); *G06T 5/20* (2013.01); *G06T 5/50* (2013.01); *G06T 2207/20221* (2013.01)

(58) Field of Classification Search
CPC ............. G06T 5/002; G06T 5/20; G06T 5/50; G06T 2207/20221; H04N 5/23232
See application file for complete search history.

(56) References Cited

U.S. PATENT DOCUMENTS

2015/0116353 A1  4/2015 Miura
2019/0043171 A1* 2/2019 Yahata ...................... G06T 5/50

FOREIGN PATENT DOCUMENTS

CN       1348301 A    5/2002
CN     101605208 A   12/2009
(Continued)

OTHER PUBLICATIONS

Saurabh Saini, et al.; " Intrinsic Image Decomposition Using Focal Stacks;" Computer Vision, Graphics and Image Processing; Dec. 18, 2016; pp. 1-8.

*Primary Examiner* — Antoinette T Spinks
(74) *Attorney, Agent, or Firm* — Canon U.S.A., Inc. IP Division (57) ABSTRACT

An image processing apparatus includes a calculation unit that calculates a composite ratio of each area based on a contrast value of a plurality of images, an adjustment unit that conducts an adjustment to the composite ratio, and a composition unit that generates a composite image by composition for the plurality of images based on a composite ratio resulting from the adjustment, wherein the adjustment unit makes a relationship between the composite ratios of neighboring areas for the image more smooth in the adjustment, and wherein, in the adjustment, a degree of the adjustment of a first area having a first contrast value is higher than a degree of the adjustment of a second area having a second contrast value that is higher than the first contrast value.

18 Claims, 8 Drawing Sheets

(51) Int. Cl.
    *G06T 5/50*        (2006.01)
    *G06T 5/20*        (2006.01)

(56) References Cited

FOREIGN PATENT DOCUMENTS

| | | |
|---|---|---|
| CN | 101924899 A | 12/2010 |
| CN | 102169576 A | 8/2011 |
| CN | 102377943 A | 3/2012 |
| CN | 103179341 A | 6/2013 |
| CN | 103460682 A | 12/2013 |
| CN | 104125446 A | 10/2014 |
| CN | 106031145 A | 10/2016 |
| JP | 2014-103626 A | 6/2014 |
| JP | 2014-229988 A | 12/2014 |
| JP | 2015-216532 A | 12/2015 |

\* cited by examiner

(«IMAGE PROCESSING APPARATUS FOR CALCULATING A COMPOSITE RATIO OF EACH AREA BASED ON A CONTRAST VALUE OF IMAGES, CONTROL METHOD OF IMAGE PROCESSING APPARATUS, AND COMPUTER-READABLE STORAGE MEDIUM

BACKGROUND OF THE INVENTION

Field of the Invention

The present invention relates to an image processing apparatus that composites a plurality of images having different in-focus positions, and to an image pickup apparatus, a control method of the image processing apparatus, and a computer-readable storage medium therefor.

Description of the Related Art

In a case where image pickup for a plurality of objects having greatly different distances therebetween is performed or in a case where image pickup for an object that is long in a depth direction is performed, only a part of the object may be brought into focus because the depth of field is insufficient. To address this issue, Japanese Patent Application Laid-Open No. 2015-216532 discusses a depth compositing technology. In this technology, a plurality of images having different in-focus positions is picked up, and only in-focus areas are extracted from the respective images and composited into one image, so that a composite image in which focus is achieved in the entire imaging area is generated.

However, when the above-described depth compositing method is used, there is a case where a defect appears in a composite image because a composite ratio is not uniform on the boundary of an object and a composite boundary is thereby made noticeable. Meanwhile, it is expected that the above-described issue will be addressed by blurring the entire composite image, but if there is a portion where it is desirable to express details, the details of this portion may be lost.

SUMMARY OF THE INVENTION

The present invention is directed to an image processing apparatus that can achieve a balance between details of an object and a smooth change in composite ratio between neighboring pixels, in an image composited using a plurality of images having different in-focus positions.

According to an aspect of the present invention, an image processing apparatus includes at least one memory configured to store instructions, and at least one processor in communication with the at least one memory and configured to execute the instructions to generate a composite ratio for composition of a plurality of images, for each area of the plurality of images, based on a contrast value of the area, conduct an adjustment to the composite ratio, and generate a composite image by the plurality of images based on a composite ratio after the adjustment. For at least one image of a part of the plurality of images, a relationship (i.e., gradient, slope, etc.,) between the composite ratios of neighboring areas becomes more smooth after the adjustment. For example, a gradient and/or a slope of the composite ratios of neighboring areas of one image becomes more smooth after the adjustment. Furthermore, the composite ratio spreads more widely in an area than in another area after the adjustment. A degree of the adjustment of a first area having a first contrast value is higher than a degree of the adjustment of a second area having a second contrast value that is higher than the first contrast value.

According to the configuration of the present invention, it is possible to provide an image processing apparatus that achieves a smooth change in composite ratio between neighboring pixels while maintaining details of an object, in an image composited using a plurality of picked-up images having different in-focus positions.

Further features of the present invention will become apparent from the following description of exemplary embodiments with reference to the attached drawings.

DESCRIPTION OF THE EMBODIMENTS

An exemplary embodiment of the present invention will be described in detail below with reference to the attached drawings.

Figure 1:
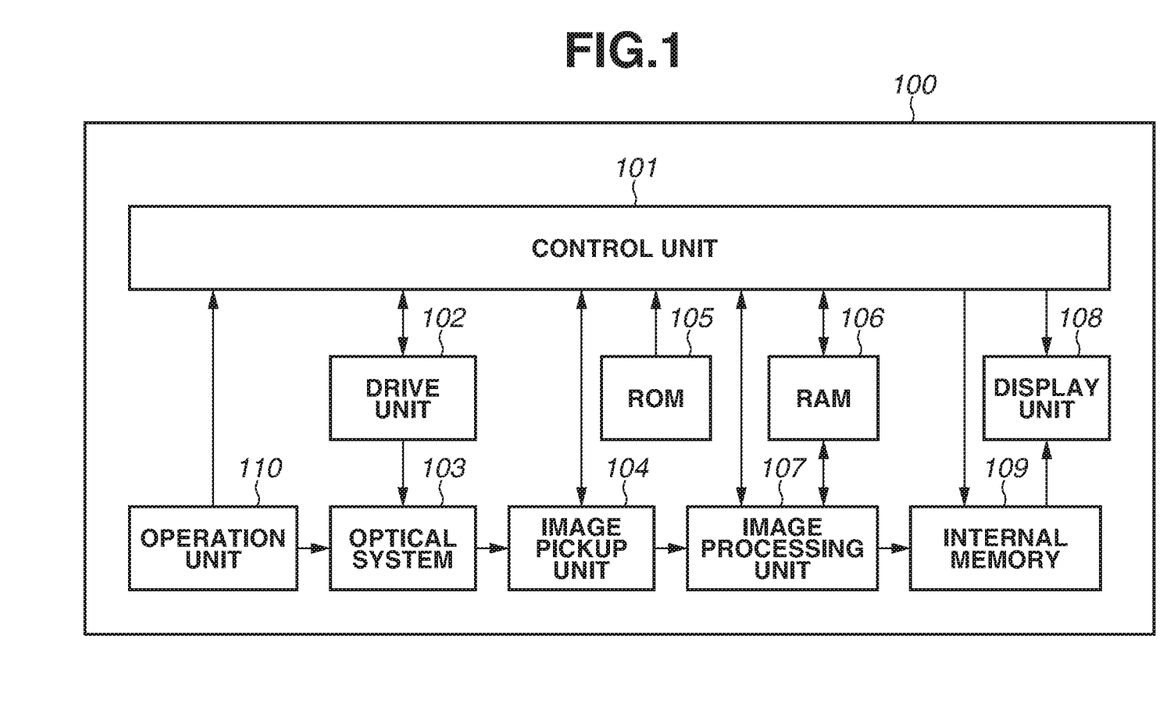
FIG. 1 is a block diagram illustrating a structure of a digital camera according to an exemplary embodiment of the present invention.

FIG. 1 is a block diagram illustrating a structure of a digital camera serving as an image processing apparatus according to an exemplary embodiment of the present invention. A digital camera 100 can pick up a still image, and record information indicating an in-focus position. The digital camera 100 can also perform calculation of a contrast value and composition of images. Further, the digital camera 100 can perform enlargement processing or reduction processing, on an image stored upon pickup or an image input from outside.

A control unit 101 is, for example, a signal processor such as a central processing unit (CPU) or a micro processing unit (MPU). The control unit 101 controls each part of the digital camera 100 while reading out a program stored beforehand in a read only memory (ROM) 105 to be described below. For example, as will be described below, the control unit 101 issues a command for each of start and end of image pickup to an image pickup unit 104 to be described below. Alternatively, the control unit 101 issues a command for image processing to an image processing unit 107 to be described below, based on the program stored in the ROM 105. A command provided by a user is input into the digital camera 100 by an operation unit 110 to be described below, and reaches each part of the digital camera 100 via the control unit 101.

A drive unit 102 incudes a motor, and mechanically operates an optical system 103 to be described below, based on a command of the control unit 101. For example, the drive unit 102 adjusts a focal length of the optical system 103 by moving the position of a focus lens included in the optical system 103 based on a command of the control unit 101.

The optical system 103 includes a zoom lens, the focus lens, and an iris diaphragm. The iris diaphragm is a mechanism for adjusting the quantity of light passing therethrough. It is possible to change an in-focus position by changing a lens position.

The image pickup unit 104 is a photoelectric conversion element, and photoelectrically converts an incident light signal into an electrical signal. For example, a sensor such as a charge-coupled device (CCD) sensor or a complementary metal oxide semiconductor (CMOS) sensor is applicable to the image pickup unit 104. The image pickup unit 104 has a moving image pickup mode, and can pick up each of a plurality of temporally consecutive images, as each frame of a moving image.

The ROM 105 is a nonvolatile read-only memory serving as a storage medium. The ROM 105 stores, in addition to a program for an operation of each block included in the digital camera 100, a parameter necessary for the operation of each block. A random access memory (RAM) 106 is a rewritable volatile memory. The RAM 106 is used as a temporary storage area for data output in the operation of each block included in the digital camera 100.

The image processing unit 107 performs various kinds of image processing including white balance adjustment, color interpolation, and filtering, for an image output from the image pickup unit 104 or data of an image signal recorded in an internal memory 109 to be described below. In addition, the image processing unit 107 performs compression processing in a standard such as Joint Photographic Experts Group (JPEG), for data of an image signal picked up by the image pickup unit 104.

The image processing unit 107 includes an integrated circuit (an application-specific integrated circuit (ASIC)) in which circuits each performing specific processing are integrated. Alternatively, the control unit 101 may perform some or all of the functions of the image processing unit 107, by reading a program from the ROM 105 and performing processing based on this program. In a case where the control unit 101 performs all the functions of the image processing unit 107, it is not necessary to provide the image processing unit 107 as hardware.

A display unit 108 is a liquid crystal display or an organic electroluminescence (EL) display for displaying an image temporarily stored in the RAM 106, an image stored in the internal memory 109 to be described below, or a setting screen of the digital camera 100.

The internal memory 109 is an area for recording an image picked up by the image pickup unit 104, an image processed by the image processing unit 107, and information such as information indicating an in-focus position in image pickup. Another type of device such as a memory card can be used in place of the internal memory.

The operation unit 110 is, for example, a button, a switch, a key, and a mode dial provided in the digital camera 100, or a touch panel that the display unit 108 doubles as. A command provided by the user reaches the control unit 101 via the operation unit 110.

Figure 2:
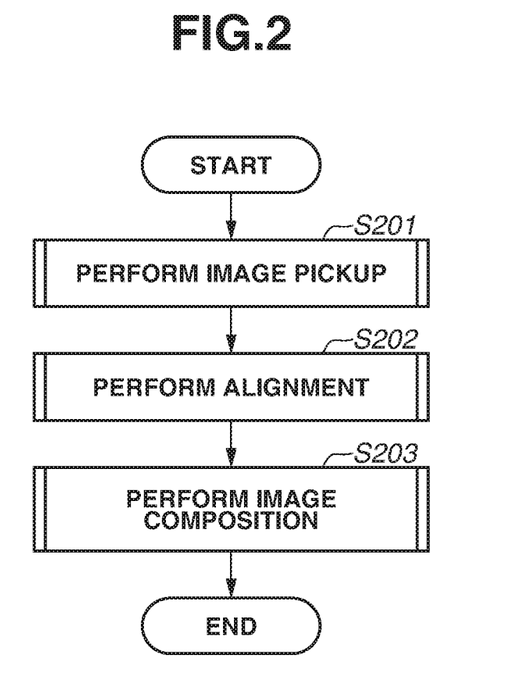
FIG. 2 is a flowchart illustrating generation of a composite image in the exemplary embodiment of the present invention.

FIG. 2 is a flowchart illustrating generation of a composite image in the present exemplary embodiment. In step S201, the image pickup unit 104 picks up a plurality of images having different in-focus positions. In step S202, the control unit 101 aligns the plurality of images picked up by the image pickup unit 104 in step S201 so that angles of view coincide with one another or at least partially overlap each other. In step S203, the image processing unit 107 generates a composite image by performing composition of the aligned images. Each of these steps will be described in detail below.

Figure 3:
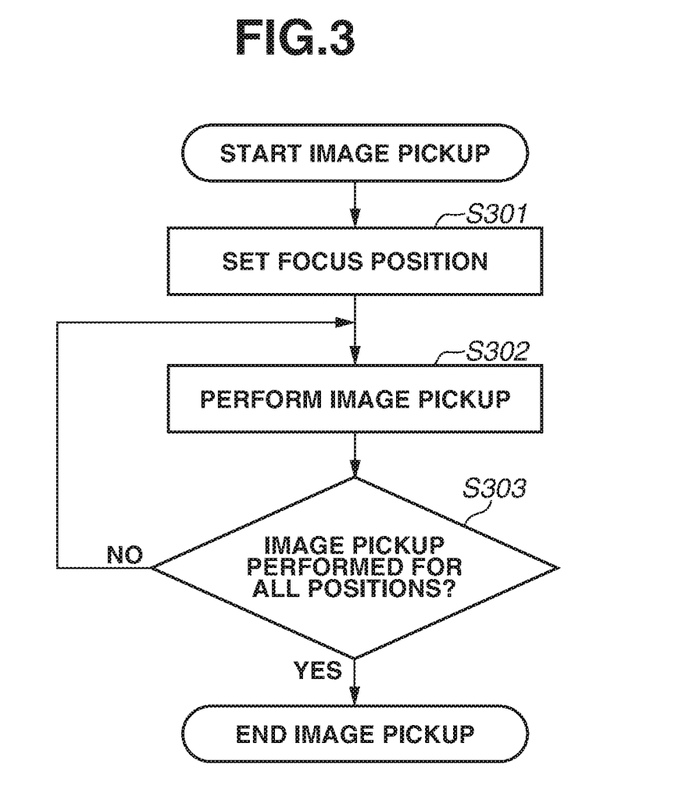
FIG. 3 is a flowchart illustrating image pickup in the exemplary embodiment of the present invention.

FIG. 3 is a flowchart illustrating the image pickup in step S201 in the present exemplary embodiment.

In step S301, the control unit 101 sets a focus position. For example, the user designates an in-focus position via the touch panel that the display unit 108 doubles as, and designates a plurality of focus positions at regular intervals along an optical axis direction of a focus position corresponding to the in-focus position. At the same time, the control unit 101 determines an image pickup sequence in distance order, for the set focus positions.

In step S302, the image pickup unit 104 picks up an image at the top focus position in the image pickup sequence among focus positions not used for image pickup, among the focus positions set in step S301.

In step S303, the control unit 101 determines whether image pickup has been performed for all the focus positions set in step S301. In a case where the image pickup has been performed for all the focus positions (YES in step S303), the processing in the flowchart illustrated in FIG. 3 ends. In a case where there is a focus position not used for the image pickup (NO in step S303), the processing returns to step S302.

The above-described image pickup method can be performed a less number of times using a camera such as a multiple lens camera including a plurality of optical systems 103 and a plurality of image pickup units 104.

Figure 4:
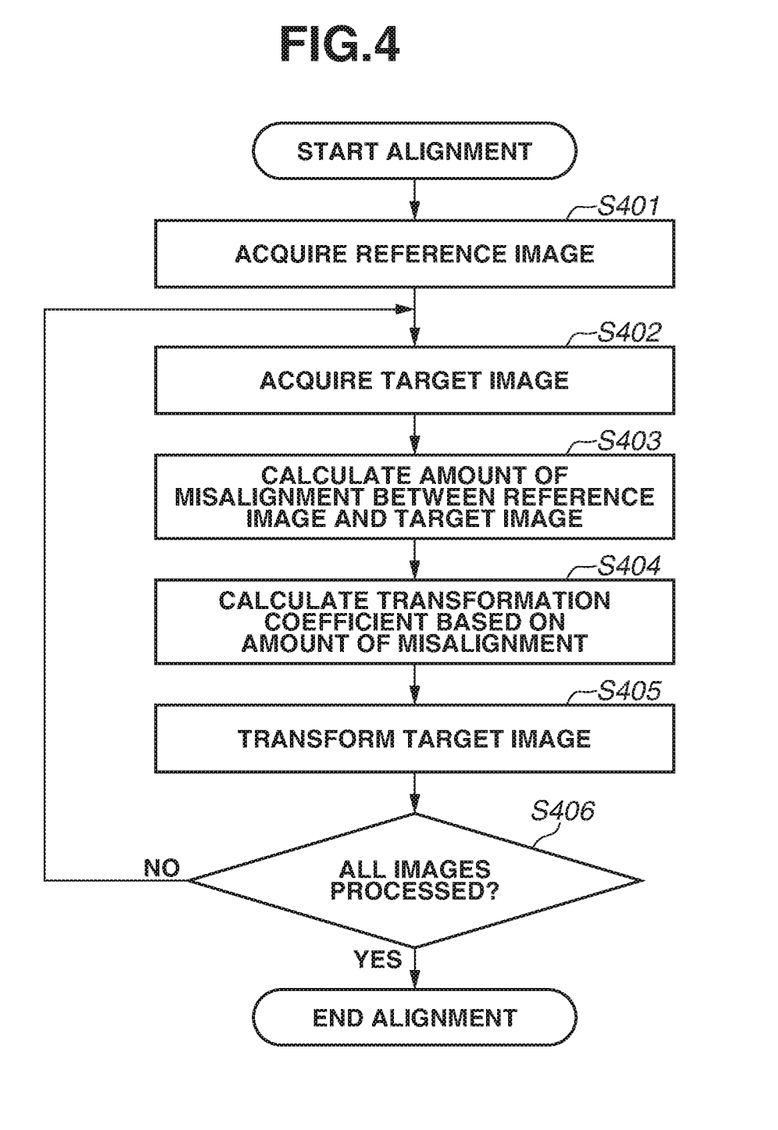
FIG. 4 is a flowchart illustrating alignment in the exemplary embodiment of the present invention.

FIG. 4 is a flowchart illustrating the alignment in step S202 in the present exemplary embodiment.

In step S401, the control unit 101 acquires a reference image for alignment from the images picked up by the image pickup unit 104 in step S201. The reference image for the alignment is an image at the top in the image pickup sequence. Alternatively, the reference image for the alignment can be an image having the narrowest angle of view among the picked-up images, because performing image pickup while changing the focus position causes slight variation in the angle of view between the picked-up images.

In step S402, the control unit 101 acquires a target image for alignment processing. The target image is any image except for the reference image acquired in step S401 and this image has not undergone the alignment processing. If the reference image is the image at the top in the image pickup sequence, the control unit 101 may acquire the target images sequentially in the image pickup sequence.

In step S403, the control unit 101 calculates an amount of positional misalignment between the reference image and the target image. An example of a method for this calculation will be described below. First, the control unit 101 sets a plurality of blocks in the reference image. It is preferable that the control unit 101 set the plurality of blocks so that the sizes of the respective blocks are equal. Next, the control unit 101 sets a range of the target image at the same position as that of each block in the reference image, as a search range. The set range is wider than the block in the reference image. The control unit 101 calculates a corresponding point at which a sum of absolute difference (SAD) of luminance with respect to the block in the reference image is minimized, in the search range in each of the target images. The control unit 101 calculates, as a vector, the positional misalignment in step S403 based on the center of the block in the reference image and the above-described corresponding point. The control unit 101 can use, besides the SAD, a sum of squared differences (SSD) and normalized cross correlation (NCC), in the calculation of the corresponding point described above.

In step S404, the control unit 101 calculates a transformation coefficient based on the amount of positional misalignment between the reference image and the target image. The control unit 101 uses, for example, a projective transformation coefficient as the transformation coefficient. However, the transformation coefficient is not limited to the projective transformation coefficient. An affine transformation coefficient or a simplified transformation coefficient based on only a horizontal and vertical shift can be used.

In step S405, the image processing unit 107 performs transformation for the target image, using the transformation coefficient calculated in step S404.

For example, the control unit 101 can perform the transformation, using the following expression (1).

$$I' = \begin{pmatrix} x' \\ y' \\ 1 \end{pmatrix} = AI = \begin{pmatrix} a & b & c \\ d & e & f \\ 0 & 0 & 1 \end{pmatrix} \cdot \begin{pmatrix} x \\ y \\ 1 \end{pmatrix} \quad (1)$$

In the expression (1), (x',y') represents coordinates after the transformation, and (x,y) represents coordinates before the transformation. A matrix A represents the transformation coefficient calculated by the control unit 101 in step S404.

In step S406, the control unit 101 determines whether the alignment has been performed for all the images except for the reference image. In a case where the alignment has been performed for all the images except for the reference image (YES in step S406), the processing in this flowchart ends. In a case where there is an unprocessed image (NO in step S406), the processing returns to step S402.

Figure 5:
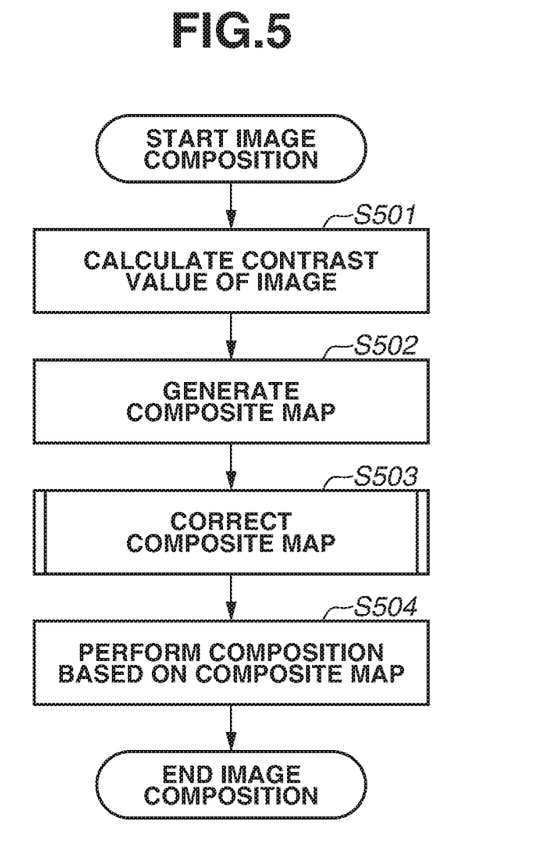
FIG. 5 is a flowchart illustrating composition of images in the exemplary embodiment of the present invention.

FIG. 5 is a flowchart illustrating the image composition in step S203 in the present exemplary embodiment.

In step S501, the image processing unit 107 calculates a contrast value for each of the images after the alignment (including the reference image). For example, the contrast value is calculated by the following method. First, the image processing unit 107 calculates a luminance Y, using the following expression (2), based on color signals Sr, Sg, and Sb of each pixel.

$$Y = 0.299Sr + 0.587Sg + 0.114Sb \quad (2)$$

Next, the image processing unit 107 calculates a contrast value I in a pixel of interest, using a Sobel filter, in a matrix L of the luminance Y in a 3×3 pixel range including the pixel of interest, as expressed in the following expressions (3) to (5).

$$I_h = \begin{pmatrix} -1 & 0 & 1 \\ -2 & 0 & 2 \\ -1 & 0 & 1 \end{pmatrix} \cdot L \quad (3)$$

$$I_v = \begin{pmatrix} -1 & -2 & -1 \\ 0 & 0 & 0 \\ 1 & 2 & 1 \end{pmatrix} \cdot L \quad (4)$$

$$I = \sqrt{I_h^2 + I_v^2} \quad (5)$$

The above-described method for calculating the contrast value is only an example. For example, an edge detection filter such as a Laplacian filter or a bandpass filter for passing a predetermined bandwidth can be used for the filter.

In step S502, the image processing unit 107 generates a composite map. The image processing unit 107 calculates a composite ratio by comparing the contrast values of the pixels at the same positions in the respective images after the alignment.

For example, the image processing unit 107 applies a composite ratio of 100% to a pixel having the highest contrast value, among the pixels at the same positions.

It is possible to calculate a composite ratio of a pixel located at coordinates(x,y) in the mth image among an M number of images, using the following expression (6).

$$A_m(x, y) = \frac{C_m(x, y)}{\sum_{k=1}^{M} C_k(x, y)} \quad (6)$$

In step S503, the image processing unit 107 corrects the composite map calculated in step S502.

Figure 6:
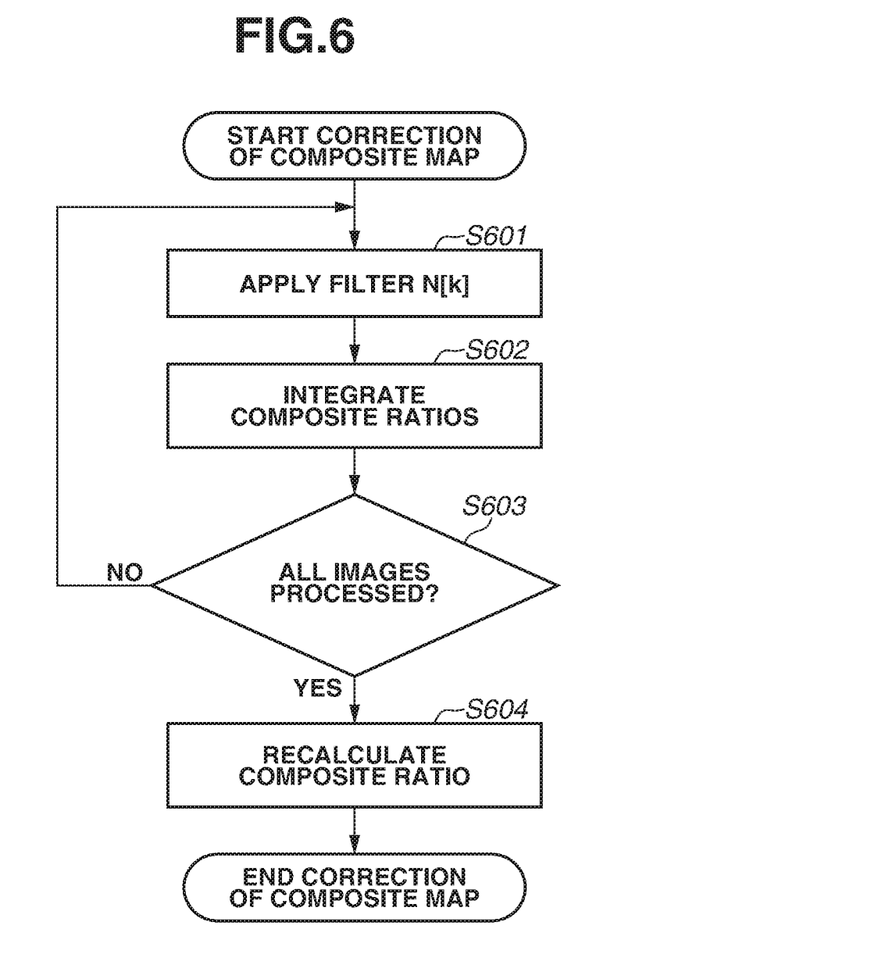
FIG. 6 is a flowchart illustrating generation of a composite map in the exemplary embodiment of the present invention.

FIG. 6 is a flowchart illustrating the correction of the composite map in step S503.

In step S601, the image processing unit 107 performs filter processing for the composite ratio corresponding to each pixel calculated in step S502. The types of the filter include a MAX filter that outputs a maximum value, for composite ratios within a reference range defined by the number of taps, or a mean value filter. In addition, in step S601, the image processing unit 107 acquires a plurality of pieces of data each having a smoothed composite ratio, by separately applying the filters that vary in the number of taps to the composite ratio. Here, for convenience of description, two types of filter, i.e., filters N[0] and N[1] that vary in smoothing level are applied, but the number of the filters is not limited to two. The number of taps of the filter N[0] is less than that of the filter N[1]. In other words, the reference range of the filter N[0] is smaller than that of the filter N[1]. The filter N[0] can be of a through output type (input and output are the same signals). Because the image processing unit 107 applies the filters, the composite ratio calculated in step S502 can be extended to surroundings. In a case where sharp change in the composite ratio between the pixels occurs, the application of the filters by the image processing unit 107 can smooth the change in the composite ratio between the pixels.

In step S602, the image processing unit 107 integrates the composite ratios after the plurality of filters is applied in step S601.

Figure 7:
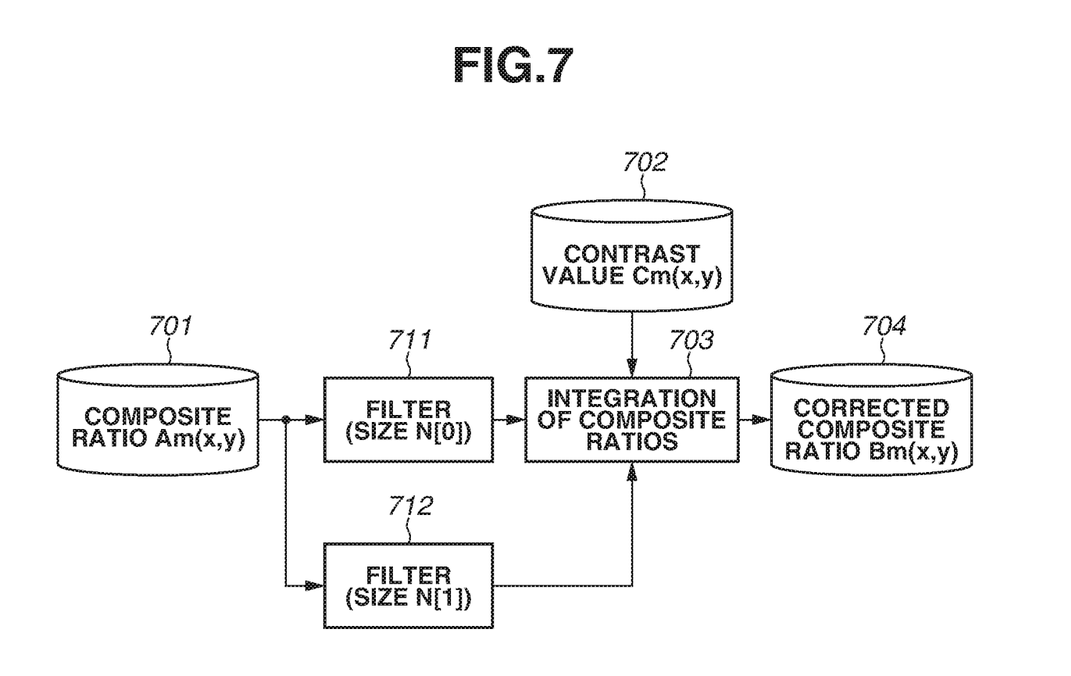
FIG. 7 is a block diagram illustrating integration of composite ratios in the exemplary embodiment of the present invention.

FIG. 7 is a block diagram illustrating the integration of the composite ratios in the present exemplary embodiment. The image processing unit 107 applies each of the filter N[0] and the filter N[1] to a composite ratio Am(x,y). Then, the image processing unit 107 integrates the composite ratios after the application of these two kinds of filters based on the contrast values. In the integration, the integration ratio of the composite ratio after the application of the filter having the small number of taps is higher in an area where the contrast value is higher, and the integration ratio of the composite ratio after the application of the filter having the large number of taps is higher in an area where the contrast value is lower. The larger the number of the taps of the filter is, the more the screen after the application of the filter is blurred. Therefore, the integration ratio of the composite ratio after the application of the filter having the small number of taps is higher in the area where the contrast value is higher, so that details in the area where the contrast value is higher can be maintained. In contrast, the integration ratio of the composite ratio after the application of the filter having the large number of taps is higher in the area where the contrast value is lower, so that suppression of a defect after composition in the area where the contrast value is lower can be expected. Furthermore, the composite ratio spreads more widely in an area than in another area after the adjustment.

Table 1 represents the relationship here among the integration ratio, each of the area contrast value, and the number of taps.

TABLE 1

| Integration Ratio | Number of Taps: Small | Number of Taps: Large |
|---|---|---|
| Contrast value: Low | Low | High |
| Contrast value: High | High | Low |

For example, in a case where the composite ratio after the application of the filter N[0] is a composite ratio Am0(x,y) and the composite ratio after the application of the filter N[1] is a composite ratio Am1(x,y), a corrected composite ratio Bm(x,y) can be calculated by the following expression (7).

$$Bm(x,y) = (1-\alpha) \times Am0(x,y) + \alpha \times Am1(x,y) \quad (7)$$

A ratio $\alpha$ used in the expression (7) is an integration ratio and can be calculated from a contrast value C(x,y). For the contrast value C(x,y) here, any of a maximum value, an additional value, and a weighted average value of the contrast values of coordinates (x,y) of a plurality of images can be used.

Figure 8:
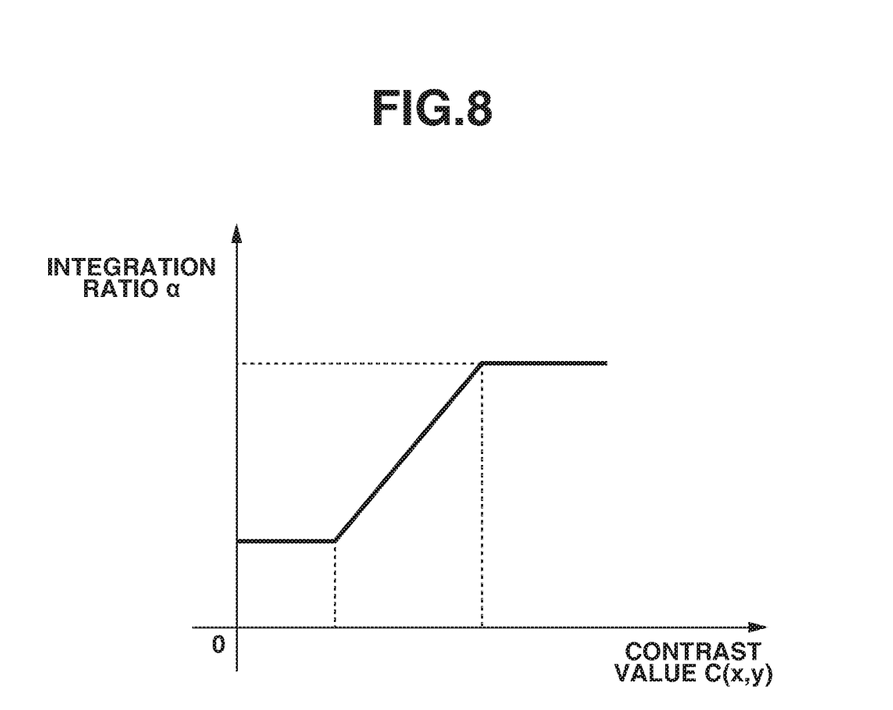
FIG. 8 is a diagram illustrating an example of a relationship between an integration ratio $\alpha$ and a contrast value $C(x,y)$ in the exemplary embodiment of the present invention.

FIG. 8 is a graph illustrating an example of the relationship between the integration ratio $\alpha$ and the contrast value C(x,y) in the present exemplary embodiment.

In step S603, the control unit 101 determines whether all the images are processed. In a case where there is an unprocessed image (NO in step S603), the processing returns to step S601 in which the image processing unit 107 performs the filter processing for the unprocessed image.

Finally, the processing proceeds to step S604. In step S604, the image processing unit 107 recalculates the composite ratio. Here, the image processing unit 107 performs normalization for the corrected composite ratio Bm(x,y), and thereby calculates a composite ratio Bm'(x,y) to be finally used for generation of a composite image. Specifically, the image processing unit 107 performs the calculation based on the following expression (8).

$$B'_m(x, y) = \frac{B_m(x, y)}{\sum_{k=1}^{M} B_k(x, y)} \quad (8)$$

In the expression (8), M represents the number of images, and (x,y) represents the coordinates. The normalization is performed based on the expression (8), so that 1 is determined as the sum of the composite ratios Bm'(x,y) of the same coordinates after the alignment.

In step S504, the image processing unit 107 generates a composite image based on the following expression (9).

$$O(x, y) = \sum_{k=1}^{M} B'_m(x, y) \cdot I_k(x, y) \quad (9)$$

In the expression (9), Ik(x,y) represents the pixel value of the coordinates(x,y) of the kth image, and O(x,y) represents the pixel value of the coordinates (x,y) of the composite image.

According to the present exemplary embodiment, when a depth composite image is generated, it is possible to reduce defects of the composite image while maintaining details of the image.

The exemplary embodiment is described above, based on the digital camera for personal use. However, the present exemplary embodiment is applicable to other types of apparatuses such as a portable, a smartphone, and a network camera connected to a server, as far as the apparatus is equipped with a depth compositing function. Alternatively, a part of the above-described processing can be performed by an apparatus such as a portable, a smartphone, or a network camera connected to a server.

According to the configuration of the present exemplary embodiment, it is possible to provide an image processing apparatus that smooths a change in a composite ratio between neighboring pixels while maintaining details of an object, in a composite image of a plurality of picked-up images having different in-focus positions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-142905, filed Jul. 30, 2018, which is hereby incorporated by reference herein in its entirety.

What is claimed is:

1. An image processing apparatus, comprising:
at least one memory configured to store instructions; and
at least one processor in communication with the at least one memory and configured to execute the instructions to:
generate a composite ratio for composition of a plurality of images, for each area of the plurality of images, based on a contrast value of each area respectively;
conduct an adjustment to the composite ratio; and
generate a composite image by the composition for the plurality of images based on the composite ratio after the adjustment,
wherein, for at least one image of a part of the plurality of images, a relationship between the composite ratios of neighboring areas becomes more smooth after the adjustment, the neighbor areas including a first area and a second area, and
wherein a degree of the adjustment of the first area having a first contrast value is higher than a degree of the adjustment of the second area having a second contrast value, the second contrast value being higher than the first contrast value.

2. The image processing apparatus according to claim 1,
wherein each of the first area and second area includes plurality of pixels, and
wherein the change of the composite ratio of the plurality of pixels extends to more surrounding pixels in the first area than in the second area after the adjustment.

3. The image processing apparatus according to claim 1, wherein angles of view of the respective plurality of images at least partially overlap each other.

4. The image processing apparatus according to claim 1, wherein the at least one processor further executes the instructions to set a larger composite ratio for a higher contrast value among contrast values, for each area of each of the respective plurality of images.

5. The image processing apparatus according to claim 4, wherein each area of each of the respective plurality of images become identical after an alignment is conducted for the plurality of images to have respective angles of view coinciding with one another.

6. The image processing apparatus according to claim 1, wherein the at least one processor further executes the instructions to perform normalization for the composite ratio of the area of each of the respective plurality of images.

7. The image processing apparatus according to claim 1, wherein a gradient of the composite ratios of neighboring areas of one image becomes more smooth after the adjustment.

8. The image processing apparatus according to claim 1, wherein a slope of the composite ratios of neighboring areas of one image becomes more smooth after the adjustment.

9. The image processing apparatus according to claim 1, wherein the at least one processor further executes the instructions to obtain a value by performing integration including applying each of a plurality of filters having different reference ranges to the composite ratio and by further applying an integration ratio to the composite ratio.

10. The image processing apparatus according to claim 9,
wherein the at least one processor further executes the instructions to determine the integration ratio to be applied to the composite ratio after the filter is applied based on the reference range of the filter,
wherein the integration ratio is lower as the contrast value of an area to which the filter is applied is lower and the reference range of the filter is narrower, and
wherein the integration ratio is higher as the contrast value of an area to which the filter is applied is lower and the reference range of the filter is wider.

11. The image processing apparatus according to claim 1, wherein the plurality of images has different focus positions.

12. The image processing apparatus according to claim 1, wherein a depth of field in the composite image is deeper than that in the plurality of images.

13. An image pickup apparatus, comprising:
an image sensor configured to pick up a plurality of images;
at least one memory configured to store instructions; and
at least one processor in communication with the at least one memory and configured to execute the instructions to:
generate a composite ratio for composition of a plurality of areas of the plurality of images, for each area of the plurality of images, based on a contrast value of each of the areas;
conduct an adjustment to the composite ratio; and
generate a composite image by the composition for the plurality of images based on the composite ratio after the adjustment,
wherein, for at least one image of a part of the plurality of images, a relationship between the composite ratios of neighboring areas becomes more smooth after the adjustment, the neighbor areas including a first area and a second area, and
wherein a degree of the adjustment of the first area having a first contrast value is higher than a degree of the adjustment of the second area having a second contrast value, the second contrast value being higher than the first contrast value.

14. A control method to control an image processing apparatus, comprising:
generating a composite ratio for composition of a plurality of areas of the plurality of images, for each area of the plurality of images, based on a contrast value of each of the areas;
conducting an adjustment to the composite ratio; and
generating a composite image by the composition for the plurality of images based on the composite ratio after the adjustment,
wherein, for at least one image of a part of the plurality of images, a relationship between the composite ratios of neighboring areas becomes more smooth after the adjustment, the neighbor areas including a first area and a second area, and
wherein a degree of the adjustment of the first area having a first contrast value is higher than a degree of the adjustment of the second area having a second contrast value, the second contrast value being higher than the first contrast value.

15. A non-transitory computer-readable storage medium storing instructions that cause a computer to execute a method for controlling an image processing apparatus, the method comprising:
generating a composite ratio for composition of a plurality of areas of the plurality of images, for each area of the plurality of images, based on a contrast value of each of the areas;
conducting an adjustment to the composite ratio; and
generating a composite image by the composition for the plurality of images based on a composite ratio after the adjustment, wherein, for at least one image of a part of the plurality of images, a relationship between the composite ratios of neighboring areas becomes more smooth after the adjustment, and wherein a degree of the adjustment of a first area having a first contrast value is higher than a degree of the adjustment of a second area having a second contrast value that is higher than the first contrast value.

16. The image pickup apparatus according to claim 13, wherein the at least one processor further executes the instructions to obtain a value by performing integration including applying each of a plurality of filters having different reference ranges to the composite ratio and by further applying an integration ratio to the composite ratio.

17. The control method according to claim 14, further comprising obtaining a value by performing integration including applying each of a plurality of filters having different reference ranges to the composite ratio and by further applying an integration ratio to the composite ratio.

18. The non-transitory computer-readable storage medium according to claim 15, further comprising obtaining a value by performing integration including applying each of a plurality of filters having different reference ranges to the composite ratio and by further applying an integration ratio to the composite ratio.

* * * * *